May 26, 1936. W. M. BAGER Re. 19,979

EXCAVATING DIPPER

Original Filed April 26, 1934

Inventor:
William M. Bager
by:
Hoar, Ruhlff & Arnaud
Attorneys.

Reissued May 26, 1936 Re. 19,979

UNITED STATES PATENT OFFICE 19,979

EXCAVATING DIPPER

William M. Bager, Fox Point, Wis., assignor to Bucyrus-Erie Company, South Milwaukee, Wis., a corporation of Delaware Original No. 2,018,628, dated October 22, 1935, Serial No. 722,424, April 26, 1934. Application for reissue November 16, 1935, Serial No. 50,401

11 Claims. (Cl. 214—145)

My invention relates to new and useful improvements in excavating dippers, and more particularly to that type of excavating dipper which is mounted on the end of a handle or handles carried by a power shovel. The shovel possesses mechanism for imparting both swinging and thrusting movements to the handle or handles, and hence to the dipper.

The main body of such a dipper is normally of a substantially cubical form, open at the top and bottom. The handles are affixed to one side of the dipper, called the "back". The opposite side of the dipper, called the "front", carries at its upper edge a digging lip and/or a row of digging teeth.

The bottom opening of the dipper is closed by a door, hinged at the back of the dipper, and latched at the front.

It is the principal object of my invention to improve the construction of this door, and of the cooperating parts of the dipper proper.

In order for the door to swing clear of the lower opening of the dipper, it is necessary for the hinges to be pivoted well up on the back of the dipper, but this introduces two objectionable features, namely: (1) the hinge is weakened by the necessity of having a long portion of the hinge extending from its pivot to its point of attachment to the door; and (2) this long portion interferes with the dipper handle and dipper handle end casting when the door swings open.

Furthermore I have found that, with the use of the conventional flat door in digging in sticky material, the door on opening merely breaks away from the bottom of the sticky material without dislodging the material from the dipper proper; whereas, if the door be built up to contain some of the material, the exit of the material is started by the opening of the door. And the provision of side walls on the door serves to direct and concentrate the fall of the material, instead of permitting it to scatter.

However, if these side walls join the bottom of the door at an abrupt angle and/or if they extend clear to the open end of the door, they impede the dumping. Still furthermore, I have found that, for grading work, it is important to eliminate a substantial portion of the lower rear corner edge of the dipper, for the two purposes of eliminating deadspace and of permitting the drawing back of the dipper close to the boom to start a grading cut.

With these considerations in mind, it is my object to attain the above-described advantages, while avoiding the above-described disadvantages.

In addition to my principal object, I have worked out a number of novel and useful details, which will be readily evident as the description progresses.

My invention consists in the novel parts, and in the combinations and arrangements thereof, which are defined in the appended claims; and of which one embodiment is exemplified in the accompanying drawing, which is hereinafter particularly described and explained.

Throughout the description, the same reference number is applied to the same member or to similar members.

Figure 1:
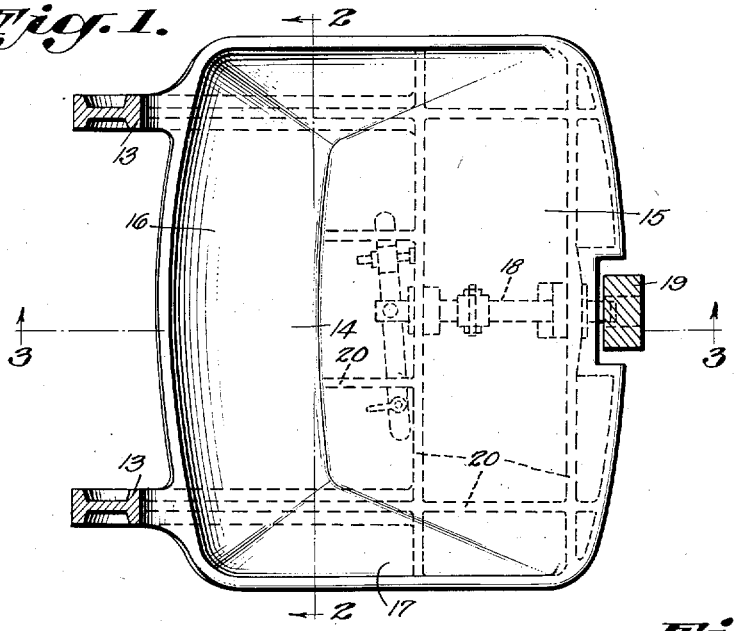
Figure 1 is a plan view of the door of my dipper, showing in section the rear portion of the hinges and the latch-keeper on the dipper proper. This view is taken along the line 1—1 of Figure 3.
Figure 2:
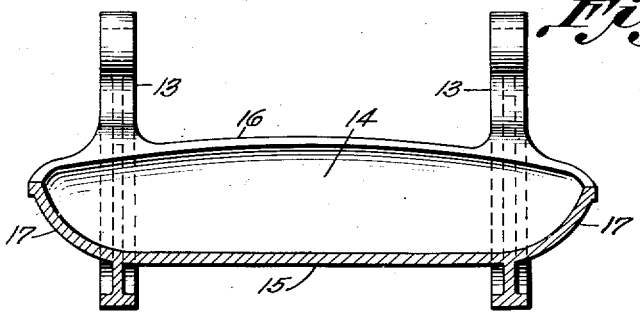
Figure 2 is a lateral vertical section, taken along the line 2—2 of Figure 1.
Figure 3:
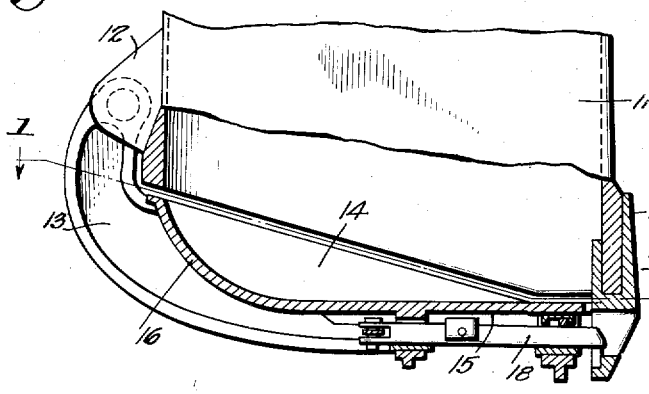
Figure 3 is a longitudinal vertical section, taken along the line 3—3 of Figure 1.

Referring to the drawing, it will be seen that 11 is the main body of the dipper proper. The dipper proper carries, on its back, lugs 12 (of which only one is shown) for pivoting the hinges 13 of the door 14. The back of the dipper is secured to the dipper-handle or handles (not shown) in any conventional manner.

It is to be noted that the main forward portion 15 of the door is flat, and that the rearward 16 and sideward 17 portions curve upward, so as to form a door conforming in general to the shape of a sugar-scoop.

It is also to be noted that, by virtue of the curved form of the back 16 of the door 14, the portion of the hinges lying to the rear of the door, is much shorter than in the conventional construction of the prior art.

The door carries the conventional latch 18, and the dipper proper carries the conventional latch-keeper 19, both of which may be of any well-known form.

The door may be provided with stiffening ribs 20; but, by virtue of the shape of the door, these may be smaller and fewer than would otherwise be required.

Having now described and illustrated one form of my invention, I wish it to be understood that my invention is not to be limited to the specific form or arrangement of parts hereinbefore described, except insofar as such limitations are specified in the appended claims.

I claim:

1. In an excavating dipper, the combination of: a main body, having a back, two sides and a front, the bottom edges of the sides sloping upwardly from front to rear; a bottom door, having a substantially flat bottom portion, a back portion tangent thereto and curving gradually upwardly therefrom, and side portions tangent to the flat portion and curving gradually upwardly therefrom, said side portions being less and less high as they approach the front of the door; combined hinges and stiffening ribs, extending beneath a portion of the bottom of the door; and pivots for the hinges, carried by the back of the main body closely adjacent the juncture of this back with the back of the door.

2. In an excavating dipper, the combination of: a main body, having a back, two sides and a front, the bottom edges of the sides sloping upwardly from front to rear; a bottom door, having a bottom portion substantially perpendicular to the front of the main body, a back portion curving gradually upwardly from the bottom portion, and side portions curving gradually upwardly from the bottom portion, said side portions being less and less high as they approach the front of the door; hinges extending beneath a portion of the bottom of the door; and pivots for the hinges, carried by the back of the main body closely adjacent the juncture of this back with the back of the door.

3. In an excavating dipper, the combination of: a main body, having a back, two sides and a front, the bottom edges of the sides sloping upwardly from front to rear; a bottom door, having a bottom portion, a back portion sloping gently upwardly from the bottom portion, so as to eliminate a substantial part of the lower rear corner of the dipper and side portions sloping upwardly from the bottom portions; hinges extending beneath a portion of the bottom of the door, and pivots for the hinges, carried by the back of the main body closely adjacent the juncture of this back with the back of the door.

4. In an excavating dipper, the combination of: a main body, having a back, two sides and a front, the bottom edges of the sides sloping upwardly from front to rear; a bottom door, having a substantially flat bottom portion substantially perpendicular to the front of the main body, and having back and side portions curving upwardly to meet the back and sides of the main body; combined hinges and stiffening ribs, extending beneath a portion of the bottom of the door; and pivots for the hinges, carried by the back of the main body closely adjacent the juncture of this back with the back of the door.

5. In an excavating dipper, the combination of: a main body, having a back, two sides and a front, the bottom edges of the sides sloping upwardly from front to rear; a bottom door, having a bottom portion substantially perpendicular to the front of the main body, and having back and side portions curving upwardly to meet the back and sides of the main body; hinges, extending beneath a portion of the bottom of the door; and pivots for the hinges, carried by the back of the main body closely adjacent the juncture of this back with the back of the door.

6. In an excavating dipper, the combination of: a main body, having a back, two sides and a front, the bottom edges of the sides sloping upwardly from front to rear; a bottom door, having its rear portion curved convexly as viewed from the outside, and having its side edges so sloped as to register with the edges of the sides of the main body; hinges, extending beneath a portion of the bottom of the door; and pivots for the hinges, carried by the back of the main body closely adjacent the juncture of this back with the back of the door.

7. In an excavating dipper, the combination of: a main body, having a back, two sides and a front, the bottom edges of the sides sloping upwardly from front to rear; a bottom door having its rear portion sloping gently upwardly with respect to its forward portion, so as to eliminate a substantial part of the lower rear corner of the dipper and having its side edges so sloped as to register with the edges of the sides of the main body; hinges, extending beneath a portion of the bottom of the door; and pivots for the hinges, carried by the back of the main body, closely adjacent the juncture of this back with the back of the door.

8. As a separate article of manufacture, a door for an excavating dipper, having: a bottom portion; a back portion, curving gradually upwardly from the bottom portion; side portions, curving gradually upwardly from the bottom portion, said side portions being less and less high as they approach the front of the door; and hinges, extending beneath a portion of the bottom of the door, said hinges having their pivot points closely adjacent the upper edge of the rear portion of the door; the door being so shaped, and the hinge-pivots so positioned that the edges of juncture of the door to the dipper to which it is applied will slope upwardly from front to rear.

9. As a separate article of manufacture, a door for an excavating dipper having: a bottom portion; a back portion, sloping gently upwardly from the bottom portion so as to eliminate a substantial part of the lower rear corner of the dipper; side portions, sloping upwardly from the bottom portion; and hinges, extending beneath a portion of the bottom of the door, said hinges having their pivot points closely adjacent the upper edge of the rear portion of the door, the door being so shaped and the hinge-pivots so positioned that the edges of the juncture of the door to the dipper to which it is applied will slope upwardly from front to rear.

10. As a separate article of manufacture, a bottom dump door for an excavating dipper, having its rear portion sloping gently upwardly with respect to its forward portion, so as to eliminate a substantial part of the lower rear corner of the dipper, and having hinges extending beneath a portion of the bottom of the door, said hinges having their pivot points closely adjacent the upper edge of the rear portion of the door; the door being so shaped, and the hinge-pivots so positioned, that the edges of the juncture of the door to the dipper to which it is applied will slope upwardly from front to rear.

11. As a separate article of manufacture, a bottom dump door for an excavating dipper, having its rear portion sloping gently upwardly with respect to its forward portion, so as to eliminate a substantial part of the lower rear corner of the dipper, and having hinges conforming to the rear portion of the door, said hinges having their pivot points closely adjacent the upper edge of the rear portion of the door; the door being so shaped, and the hinge-pivots so positioned, that the edges of the juncture of the door to the dipper to which it is applied will slope upwardly from front to rear.

WILLIAM M. BAGER.